(12) United States Patent
Clayton et al.

(10) Patent No.: US 11,047,787 B2
(45) Date of Patent: Jun. 29, 2021

(54) AND METHOD FOR OPTICAL BENCH FOR DETECTING PARTICLES

(71) Applicant: Research Triangle Institute, Research Triangle Park, NC (US)

(72) Inventors: Anthony Clint Clayton, Research Triangle Park, NC (US); Howard Jerome Walls, Research Triangle Park, NC (US); Roger H. Pope, Research Triangle Park, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 0 days.

(21) Appl. No.: 16/861,550

(22) Filed: Apr. 29, 2020

(65) Prior Publication Data

US 2020/0340899 A1 Oct. 29, 2020

Related U.S. Application Data

(60) Provisional application No. 62/840,153, filed on Apr. 29, 2019.

(51) Int. Cl.
*G01N 15/02* (2006.01)
*G01N 15/14* (2006.01)

(52) U.S. Cl.
CPC ..... *G01N 15/0211* (2013.01); *G01N 15/1404* (2013.01)

(58) Field of Classification Search
CPC . G01N 15/02; G01N 15/0211; G01N 15/1404
(Continued)

(56) References Cited

U.S. PATENT DOCUMENTS 3,520,172 A 7/1970 Liu et al.
3,849,654 A 11/1974 Malvin
(Continued)

FOREIGN PATENT DOCUMENTS

CN 201217660 A 4/2009
CN 101738628 A 6/2010
(Continued)

OTHER PUBLICATIONS

Abu-Rahmah et al. "Integrating nephelometer with a low truncation angle and an extended calibration scheme," 17:1723-1732 (2006).
(Continued)

*Primary Examiner* — Roy M Punnoose
(74) *Attorney, Agent, or Firm* — IP & T Group LLP

(57) ABSTRACT

An optical system for particle detection. The system includes a sample inlet housing; a sample outlet housing; a detection cavity having an axially surrounding wall and disposed between the sample inlet housing and the sample outlet housing; a light source configured to irradiate light through the detection cavity to particles of a sample fluid flowing inside the wall of the detection cavity; a light detector for detecting the light that is scattered by particles of the sample fluid in the detection cavity; an alignment rail having a base and sidewalls which a) extend from the sample inlet housing to the sample outlet housing and b) connect the sample inlet housing to the sample outlet housing; and the alignment rail comprising a channel formed by the base and the sidewalls, the channel having a channel lateral width fitting to a housing width of at least one of the sample inlet housing and the sample outlet housing, whereby the sample inlet housing, the housing, and the sample outlet housing are held in alignment together.

20 Claims, 8 Drawing Sheets

(58) Field of Classification Search
USPC .......................................................... 356/336
See application file for complete search history.

(56) References Cited

U.S. PATENT DOCUMENTS

| | | | |
|---|---|---|---|
| 4,019,017 A | | 4/1977 | Sitek et al. |
| 4,154,669 A | | 5/1979 | Goetz |
| 4,242,194 A | * | 12/1980 | Steiner .................. G01N 15/04 |
| | | | 204/645 |
| 4,473,296 A | | 9/1984 | Shofner et al. |
| 4,571,079 A | | 2/1986 | Knollenberg |
| 5,317,930 A | | 6/1994 | Wedding |
| 5,686,996 A | | 11/1997 | Fidler et al. |
| 5,922,976 A | | 7/1999 | Russell et al. |
| 6,263,744 B1 | | 7/2001 | Russell et al. |
| 6,296,425 B1 | | 10/2001 | Memory et al. |
| 6,520,034 B1 | | 2/2003 | Masquelier et al. |
| 6,522,405 B2 | * | 2/2003 | Sakamoto .......... G01N 15/0211 |
| | | | 356/336 |
| 6,854,344 B2 | | 2/2005 | Cornish et al. |
| 6,909,269 B2 | | 6/2005 | Nagai et al. |
| 7,140,265 B2 | | 11/2006 | McGill et al. |
| 7,436,515 B2 | | 10/2008 | Kaye et al. |
| 7,511,258 B2 | | 3/2009 | Bowen et al. |
| 8,030,088 B2 | | 10/2011 | McCash et al. |
| 9,772,278 B2 | | 9/2017 | Han |
| 9,915,600 B2 | * | 3/2018 | Walls .................. G01N 15/1436 |
| 10,018,551 B2 | * | 7/2018 | Walls .................. G01N 15/1436 |
| 2002/0044281 A1 | * | 4/2002 | Sakamoto .......... G01N 15/0211 |
| | | | 356/336 |
| 2009/0002704 A1 | * | 1/2009 | Burns .................... G01N 21/53 |
| | | | 356/336 |
| 2011/0049390 A1 | | 3/2011 | Murray et al. |
| 2012/0105839 A1 | | 5/2012 | Novosselov et al. |
| 2013/0042673 A1 | | 2/2013 | Saari-Nordhaus et al. |
| 2013/0042893 A1 | | 2/2013 | Ariessohn et al. |
| 2014/0017839 A1 | | 1/2014 | Li et al. |
| 2017/0241893 A1 | * | 8/2017 | Walls .................. G01N 15/1436 |
| 2017/0268980 A1 | | 9/2017 | Clayton et al. |
| 2018/0099283 A1 | * | 4/2018 | Paprotny ............. G01N 1/2202 |
| 2018/0149578 A1 | * | 5/2018 | Walls .................. G01N 15/0205 |

FOREIGN PATENT DOCUMENTS

| | | |
|---|---|---|
| CN | 101762819 A | 6/2010 |
| CN | 101974419 A | 2/2011 |
| CN | 102323111 A | 1/2012 |
| CN | 202393920 A | 8/2012 |
| CN | 102654445 | 9/2012 |
| CN | 202770678 A | 3/2013 |
| CN | 103115802 A | 5/2013 |
| CN | 103119417 A | 5/2013 |
| EP | 79079 A1 | 5/1983 |
| ES | 2030992 | 11/1992 |
| GB | 1422188 A | 1/1976 |
| GB | 1538056 A | 1/1979 |
| JP | 10318905 A | 12/1998 |
| JP | 200321219 A | 1/2003 |
| JP | 2004239365 A | 8/2004 |
| JP | 201277784 A | 4/2012 |
| JP | 2012202543 A | 10/2012 |
| KR | 101317982 B1 | 10/2013 |
| SU | 1242768 A1 | 7/1986 |
| SU | 1665267 A1 | 7/1991 |
| WO | 9010858 A | 9/1990 |
| WO | 2001095279 A1 | 12/2001 |
| WO | 2012150958 A1 | 11/2012 |
| WO | 2013063426 A | 5/2013 |
| WO | 2013123500 A1 | 8/2013 |

OTHER PUBLICATIONS

Agranovski et al., "Real-time measurement of bacterial aerosols with the UVAPS: Performance evaluation," Journal of Aerosol Science 34(3): 301-317 (2003).

Ammor, "Recent advances in the use of intrinsic fluorescence for bacterial identification and characterization," Journal of Fluorescence 17(5): 455-459 (2007).

Chow et al., "PM2.5 and PM10 Mass Measurements in California's San Joaquin Valley," Aerosol Science and Technology 40(10):796-810 (2006).

Greenwood et al., "Optical Techniques for Detecting and Identifying Biological Warfare Agents," Proceedings of the IEEE 97(6): 971-989 (2009).

Hasan et al., "Integrating Nephelometer Response Corrections for Bimodal Size Distributions," Aerosol Science and Technology 2(4): 443-453 (1983).

Hills, S.C. et al., "Fluorescence of bioaerosols: mathematical model including primary fluorescing and absorbing molecules in bacteria," Optics Express 21(19): 22285-22313 (2013).

Jeys, T.H. et al., "Advanced trigger development," Lincon Laboratory Journal 17(1): 29-62 (2007).

Pahalawatta et al., "Particle Detection and Classification in Photoelectric Smoke Detectors using Image Histogram Features," IEEE.

Penaloza, Marcos A., "Deriving the basic cell-reciprocal integrating nephelometer equation and its use for calibration purposes: a comprehensive approach," Measurement Science and Technology 10:R1-R15 (1999).

Saari, et al., "Performance of Two Fluorescence-Based Real-Time Bioaerosol Detectors: BioScout vs. UVAPS," Aerosol Science and Technology 48(4): 371-378 (2014).

Sloane et al., "Measurements of Aerosol Particle Size: Improved Precision by Simultaneous Use of Optical Particle Counter and Nephelometer," Aerosol Science and Technology 14(3): 289-301 (1991).

Varma et al. "Toward an ideal integrating nephelometer," Optics Letters 28(12): 1007-1009 (2003).

Wallace, Lance. "Real-Time Measurements of Black Carbon Indoors and Outdoors: A Comparison of the Photoelectric Aerosol Sensor and the Aethalometer," 30(10): 1015-1025 (2005).

Chow et al., "Comparability Between PM2.5 and Particle Light Scattering Measurements," Environmental Monitoring and Assessment 79: 29-45 (2002).

Written Opinion of the International Searching Authority for counterpart application PCT/US2015/046076 dated Nov. 27, 2015. (8 pages).

Written Opinion of the International Searching Authority for counterpart application PCT/US2015/046080 dated Oct. 23, 2015. (5 pages).

Hairston et al., "Design of an Intstrument for Real-time Detection of Bioaerosols Using Simultaneous Measurement of Particle Aerodynamic Size and Intrinsic Fluorescence," Journal of Aerosol Science 28(3): 471-482 (1997).

Ho et al., "Feasibility of using real-time optical methods for detecting the presence of viable bacteria aerosols at low concentrations in clean room environments," Aerobiologia 27: 163-172 (2011).

Ho, "Future of biological aerosol detection," Analytica Chimica Acta 457: 125-148 (2002).

Willeke, K., et al., "Measurement Methods," Aerosol Measurement: principles, techniques, and applications, 1993, 112-114 and 122-125, Von Nostrand Reinhold, New York City.

\* cited by examiner

AND METHOD FOR OPTICAL BENCH FOR DETECTING PARTICLES

RELATED APPLICATIONS

This application is related to and claims priority to U.S. Ser. No. 62/840,153 filed Apr. 29, 2019, entitled "DESIGN AND METHOD FOR OPTICAL BENCH FOR DETECTING PARTICLES," the entire contents which are incorporated by reference. This application is related to U.S. patent application Ser. No. 15/048,199, now U.S. Pat. No. 9,915,600, filed Feb. 19, 2016, which is a continuation-in-part of International Application No. PCT/2015/046076, filed Aug. 20, 2015, titled "DEVICES, SYSTEMS, AND METHODS FOR DETECTING PARTICLES," which claims the benefit of U.S. Provisional Patent Application Ser. No. 62/039,512, filed Aug. 20, 2014, titled "DEVICES, SYSTEMS AND METHODS FOR DETECTING PARTICLES," and U.S. Provisional Patent Application Ser. No. 62/039,519, filed Aug. 20, 2014, titled "SYSTEMS, DEVICES, AND METHODS FOR FLOW CONTROL AND SAMPLE MONITORING CONTROL," the contents of each of which are incorporated by reference herein in their entireties.

TECHNICAL FIELD

The present invention relates to a system for optical-based detection of particles in an aerosol or liquid, including measurement of light scattering and autofluorescence.

BACKGROUND

Detection of particles and colloids suspended in a fluid medium for measurement of concentration or other properties is useful in a variety of applications such as medical diagnostics, scientific research, air quality measurements, and threat detection. Examples include measurement of the concentration of particles suspended in a liquid such as proteins in blood, and airborne particles in inside environments such as building as well as outside environments.

One application of note is the measurement of the concentration and other properties of airborne particles (or particulate matter, PM) in aerosols. The United States Environmental Protection Agency (US EPA) has set exposure standards for coarse PM (between 10 µm and 2.5 µm, $PM_{10}$) and fine PM (less than 2.5 µm, $PM_{2.5}$) due to the importance of aerosol concentration in the air and its health effects. Aerosol concentrations are also important in the manufacturing industry for both protection of the health of workers and preventing contamination in the manufacturing process.

A class of aerosols of special interest is bioaerosols. Bioaerosols include bio-particles such as fungus spores, bacteria spores, bacteria, viruses, and biologically derived particles (skin cells, detritus, etc.). Some bioaerosols cause chronic and/or acute health effects, for example certain strains of black mold or *Bacillus anthraces* (causative bacteria of anthrax). Bioaerosol concentrations are important in maintaining safe hospitals, clean food processing, pharmaceutical and medical device manufacturing, and air quality. Airborne spread of diseases is of particular concern from a public health perspective. Aerosolized bioagents can also be used by terrorists to harm civilian or military populations.

Measurement (sensing) of aerosol and bioaerosol concentration is typically accomplished with optical techniques. Aerosol (e.g., solid and liquid particles ≤10 µm dispersed in air) concentration measurement is readily achieved by various light scattering measurements. See Hinds, *Aerosol Technology*, New York, John Wiley & Sons, Inc. (1982); Lehtimaki and Willeke, Measurement Methods, *Aerosol Measurement*, Willeke and Baron, New York, Van Norstrand Reinhold, 112-129 (1993). The most accurate method entails the use of a single particle counter that focuses a stream of aerosol into a detection cavity where light scattering from a long wavelength (>650 nm) laser is measured. Precision optics are required to collect and focus the scattered light (while excluding the source light) onto a photon detector. The photon detectors are made from silicon or photocathode materials (e.g., indium gallium arsenide) that undergo the photoelectric effect (convert photons to electrons). These materials are packaged into detectors that offer high amplification of the signal from the photons, such as photomultiplier tubes (PMTs) and avalanche photodiodes (APDs). These detectors have active detection areas that are small (less than 25 $mm^2$) and limited to planar geometries. Moreover, these detectors cost $100 or more, often exceeding $1,000 in the case of a high sensitivity PMT.

Autofluorescence (or intrinsic fluorescence) excited by ultraviolet (UV) and blue light is well-developed for detection of bioaerosols. See Hairston et al., "Design of an instrument for real-time detection of bioaerosols using simultaneous measurement of particle aerodynamic size and intrinsic fluorescence," *Journal of Aerosol Science* 28(3): 471-482 (1997); Ho, "Future of biological aerosol detection," *Analytical Chimica Acta* 457(1): 125-148 (2002); Agranovski et al., "Real-time measurement of bacterial aerosols with the UVAPS: Performance evaluation," *Journal of Aerosol Science* 34(3): 301-317 (2003); Ammor, "Recent advances in the use of intrinsic fluorescence for bacterial identification and characterization," *Journal of Fluorescence* 17(5): 455-459 (2007); Ho et al., "Feasability of using real-time optical methods for detecting the presence of viable bacteria aerosols at low concentrations in clean room environments," *Aerobiologia* 27(2): 163-172 (2011). Exploiting autofluorescence of microbes is widely viewed as one of the most cost-effective means to detect a potential biological threat. Bioaerosol detectors typically use a combination of light scattering (measurement of general aerosol concentration and properties) and autofluorescence (detection of emitted photons). Bioaerosol detectors based on autofluorescence rely on fluorescence from molecular fluorophores that reside within the bio-particle. For clean bioparticles, this fluorescence can be primarily attributed to biochemicals such as tryptophan and tyrosine (amino acids), nicotinamide adenine dinucleotide (NADH), and riboflavin. NADH and riboflavin absorb and emit longer wavelengths than the amino acids. See Jeys et al., "Advanced trigger development," *Lincon Laboratory Journal* 17(1): 29-62 (2007); Hill et al., "Fluorescence of bioaerosols: mathematical model including primary fluorescing and absorbing molecules in bacteria," *Optics Express* 21(19): 22285-22313 (2013). The ability to use longer wavelength excitation sources such as light emitting diodes (LEDs, excitation wavelength $\lambda_{exc}$>360 nm) or lasers ($\lambda_{exc}$>400 nm) may reduce the cost of such instruments.

Traditional bioaerosol particle detectors rely on three main components: (1) an excitation source of appropriate wavelength to excite a targeted fluorophore or collection of fluorophores; (2) precision optics (lenses and mirrors) on both the excitation and emission side to focus the source onto the narrow air stream and to enhance the collection of emitted photons from biological particles; and (3) a high gain detector such as a PMT or APD. Elastic light scattering from visible or long wavelengths is utilized to count and sometimes size the particles. Autofluorescence of biomolecules is utilized to detect microorganisms. The typical bioaerosol detector utilizes a small detection cavity, with fluorescence active volumes on the order of $1\times10^{-4}$ cm$^3$, making the window for detection of each bioaerosol particle exceedingly small. At typical flow rates, a bioaerosol particle resides within the excitation volume for 1-10 µs on average. See Hairston et al. (1997). As a result, emitted and scattered light from each bioaerosol particle is collected virtually on an individual basis, and the signal is weak. See Greenwood et al., "Optical Techniques for Detecting and Identifying Biological Warfare Agents," *Proceedings of the IEEE* 97(6): 971-989 (2009). This weak signal thus requires the use of precision lenses and mirrors to collect the weak signal and focus it onto the high gain detector (e.g., PMT or APD).

Measurement of aerosol and bioaerosol concentration and changes in concentration is possible via a variety of commercially available instruments such as the Laser Aerosol Spectrometer for aerosols (TSI Incorporated, Shoreview, Minn., USA), the Ultraviolet Aerodynamic Particle Sizer for bioaerosols (TSI Incorporated), the Wideband Integrated Bioaerosol Sensor (WIBS-4) for bioaerosols (Droplet Measurement Technologies, Boulder, Colo., USA), and the instantaneous biological analyzer and collector (FLIR Systems, Inc., Wilsonville, Oreg., USA). However, such instruments can exceed $10,000 in cost making wide spread use cost prohibitive. Furthermore, having a sufficiently dense sensor network of aerosol/bioaerosol sensors (i.e., multiples of these instruments in communication with a central network) is cost prohibitive. The high cost of a sensor network also means that capitalizing on responsive systems is challenging. For example, it would be desirable to provide several bioaerosol sensors positioned throughout a hospital or other building and networked with the building's control systems to maintain a safe environment and respond to a change in bioaerosol concentration, such as by diverting airflow or indicating the need for maintenance of filters and air handlers.

Aerosol exposure monitors have been developed that acquire data from aerosol while the aerosol is sampled in real time during a prescribed sampling period (integration period). Such devices may employ inertial impactors for aerodynamic sizing, particle collection filters for collection and subsequent analysis, and nephelometers for measuring particle concentration by acquiring light scattering data in real time. Examples of such devices are described in International Publication No. WO 2013/063426, filed Oct. 26, 2012, titled "AEROSOL EXPOSURE MONITORING," the content of which is incorporated by reference herein in its entirety. Also known are turbidometers, which measure the concentrations of particles such as cells in solution.

U.S. Pat. No. 5,686,996 (the entire contents of which are incorporated herein by reference) describes a device for aligning a laser. The device consists of a rigid member with alignment marks which define the intended point of impingement of a beam emitted from the laser. The laser is moved to allow the emitted laser beam to extend upon the alignment device and impinge upon the alignment marks. When the laser beam impinges upon alignment marks, preferably formed near the center of the alignment device, the laser is determined to be in proper alignment.

U.S. Pat. No. 7,511,258 (the entire contents of which are incorporated herein by reference) describes an optical package having a top and bottom orientation. This package included (a) a platform defining a V-groove with walls of a certain pitch; (b) a first optical component having a reference surface and two sides, each side being beveled at the certain pitch outwardly from the reference surface, the first optical component having a first optical axis, the first optical component being disposed in the V-groove such that the reference surface faces downward and the sides are in parallel contact with the walls of the V-groove; and (c) a second optical component having an outer periphery with at least two contact points and a second optical axis, the second optical component being disposed in the V-groove such that the contact points contact the walls of the V-groove and the second optical axis is coaxial with the first optical axis.

U.S. Pat. No. 6,909,269 (the entire contents of which are incorporated herein by reference) describes a particle detector including first and second cells, the first cell supplying a liquid containing particles to the second cell; electrodes respectively provided in the first cell and the second cell; a plurality of shafts; and clamp members engaged with the respective shafts; the first cell and the second cell being arranged in alignment with each other; the shafts extending through the first cell and the second cell along the alignment of the first cell and the second cell; the clamp members clamping the first cell and the second cell along the alignment U.S. Pat. No. 7,436,515 (the entire contents of which are incorporated herein by reference) describes a method and apparatus for the analysis of fluid borne particles and which is especially suitable for the detection of airborne biological particles. The apparatus for the detection of fluid borne particles includes a zone through which a fluid to be analyzed flows in use, a source of illumination to illuminate/irradiate fluid borne particles present in said zone, and a detector to detect light from the particles as an indicator of the presence or characteristics of the particles, wherein the apparatus comprises an integrating sphere and the zone is within the integrating sphere.

U.S. Pat. No. 9,772,278 (the entire contents of which are incorporated herein by reference) describes a multi-channel aerosol scattering absorption measuring instrument, comprising a light path device, a detection device and a gas path device. The light path device supplies three different wavelengths of laser entering the detection device in sequence; the detection device is provided with photoelectric detectors at multiple angles for measurement, so as to reduce the measurement error of aerosol scattering coefficient; the gas path device comprises a sample loading unit, a calibration unit and a sample discharging unit; and a light source from the light path device and a gas flow from the gas path device enter the photoacoustic cavity of the detection device respectively and are detected by a control unit.

U.S. Pat. Apl. Publ. No. 20170268980 (the entire contents of which are incorporated herein by reference) describes sample monitoring and flow control systems and methods for monitoring of airborne particulates. A system may include a particle collection filter. The system also includes a fluid moving device for moving a sample through the particle collection filter. Further, the system includes a light source configured to direct irradiating light towards the particle collection filter. The system also includes a light detector positioned to receive the irradiating light passing through the particle collection filter and configured to generate a signal representative of an amount of the received light. Further, the system includes a controller configured to receive the signal and to control the fluid moving device based on the amount of the received light.

Portable Laser Aerosol Spectrometer and Dust Monitor Model 1.108/1.109, 2010 (the entire contents of which are incorporated herein by reference) describes a dust aerosol spectrometer and dust monitors that are compact, portable, and continuously measure airborne particles and particle count distribution using an integrated gravimetric filter on which the particles are collected for further analysis after optical measurement. The measuring principle is the light scattering of single particles using a semiconductor laser as a light source. Inside the measuring cell, the scattering light is led directly and via a mirror with a wide opening angle onto the detector. The detector is positioned at a right angle to the incident laser beam. This optical alignment increases the scattering light collected by the detector and optimizes the signal-to-noise ratio. Therefore, even very small particles down to 0.25 µm respectively 0.3 µm can be detected.

Despite these systems, devices, and methods described above, there is an ongoing need for improved devices and methods for measurement of particles in aerosols, bioaerosols, and liquids.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one embodiment, an optical system for particle detection comprising a sample inlet housing; a sample outlet housing; a detection cavity having an axially surrounding wall and disposed between the sample inlet housing and the sample outlet housing; a light source configured to irradiate light through the detection cavity to particles of a sample fluid flowing inside the wall of the detection cavity; a light detector for detecting the light that is scattered by particles of the sample fluid in the detection cavity; an alignment rail having a base and sidewalls which a) extend from the sample inlet housing to the sample outlet housing and b) connect the sample inlet housing to the sample outlet housing; and the alignment rail comprising a channel formed by the base and the sidewalls, the channel having a channel lateral width fitting to a housing width of at least one of the sample inlet housing and the sample outlet housing, whereby the sample inlet housing, the housing, and the sample outlet housing are held in alignment together.

According to another embodiment, a method for measuring particles in a sample fluid includes: flowing the sample fluid through the optical system noted above and thereby into a detection cavity; directing an irradiating light through the detection cavity along a longitudinal axis to irradiate particles in the sample fluid, wherein the particles emit measurement light in response to the irradiation; and receiving at a photo-responsive material measurement light propagating from the particles.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

As used herein, the term "aerosol" generally refers to an assembly of liquid or solid particles (or particulates, or particulate matter) suspended in a gaseous medium long enough to be observed and measured. The size of aerosol particles typically ranges from about 0.001 µm to about 100 µm. See Kulkarni et al., Aerosol Measurement, $3^{rd}$ ed., John Wiley & Sons, Inc. (2011), p. 821. The term "gaseous fluid" generally refers to a gas (or gaseous fluid, or gas-phase fluid). A gas may or may not contain liquid droplets or vapor, and may or may not contain aerosol particles. An example of a gas is, but is not limited to, ambient air. An aerosol may thus be considered as comprising particles and a gas that entrains or carries the particles.

As used herein, the term "bioaerosol" generally refers to an aerosol in which one or more bio-particles are suspended or carried. The term "bio-particle" generally refers to a biological material, or the combination of a biological material and a non-biological particle on which the biological material is carried. That is, a biological material may itself be a particle freely suspended in an aerosol, or may be carried on a non-biological particle such that the biological material and the non-biological particle are suspended together in the aerosol. The biological material may be carried on the non-biological particle by any mechanism such as, for example, entrapment, embedment, adhesion, adsorption, attractive force, affinity, etc. Examples of biological materials include, but are not limited to, spores (e.g., fungal spores, bacterial spores, etc.), fungi, molds, bacteria, viruses, biological cells or intracellular components, biologically derived particles (e.g., skin cells, detritus, etc.), etc.

As used herein, for convenience the term "aerosol" generally encompasses the term "bioaerosol" and the term "particle" generally encompasses the term "bio-particle," unless indicated otherwise or the context dictates otherwise.

As used herein, the term "fluid" generally encompasses the term "liquid" as well as the term "gas," unless indicated otherwise or the context dictates otherwise. Particles suspended or carried in a liquid, as well as particles suspended or carried in an aerosol, may be detected by devices and methods disclosed herein.

As used herein, the term "light" generally refers to electromagnetic radiation, quantizable as photons. As it pertains to the present disclosure, light may propagate at wavelengths ranging from ultraviolet (UV) to infrared (IR). In the present disclosure, the terms "light," "photons," and "radiation" are used interchangeably.

As used herein, a material is "optically transparent" if it is able to efficiently pass (with minimal optical transmission loss) light of a desired wavelength or range of wavelengths.

Figure 1:
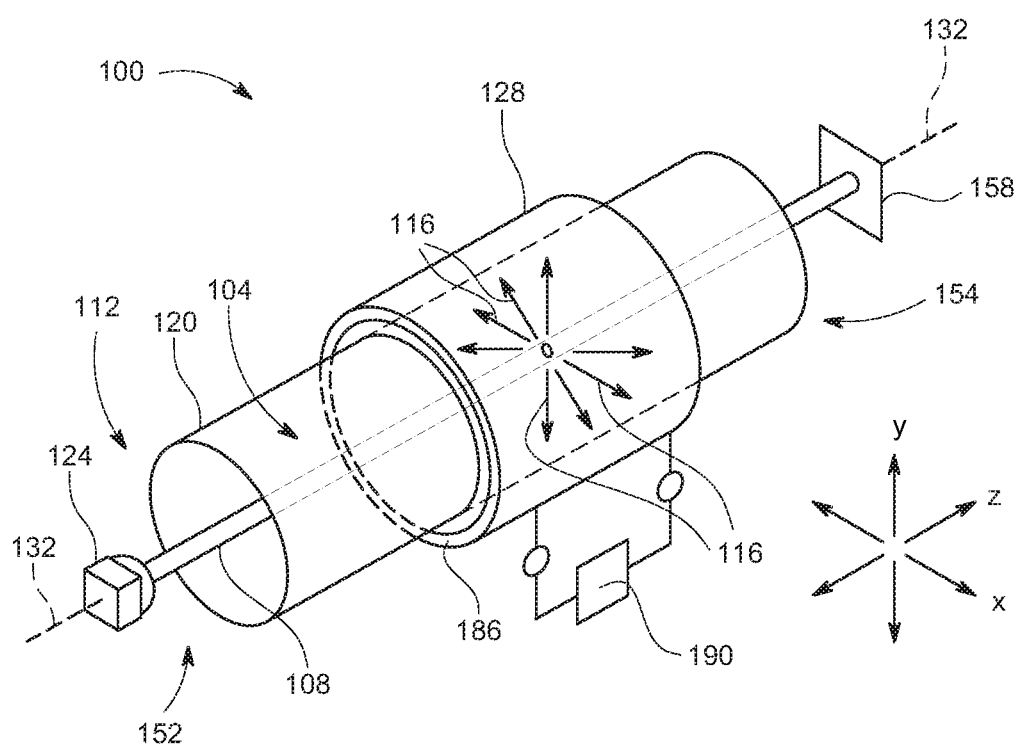
FIG. 1 is a perspective view of an example of a particle detector according to one embodiment of the present disclosure.
Figure 2:
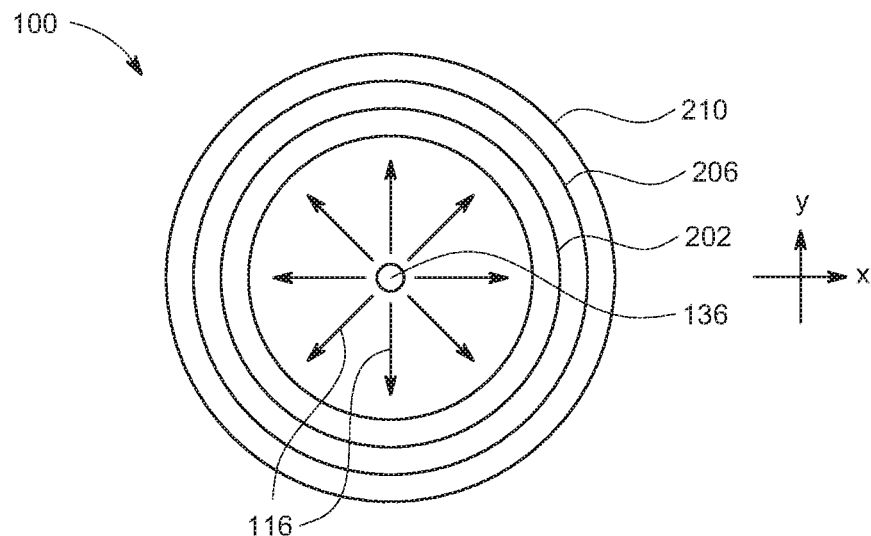
FIG. 2 is a cross-sectional view (x-y plane) of the particle detector illustrated in FIG. 1, taken at an arbitrary point along a longitudinal axis (z-axis).
Figure 3:
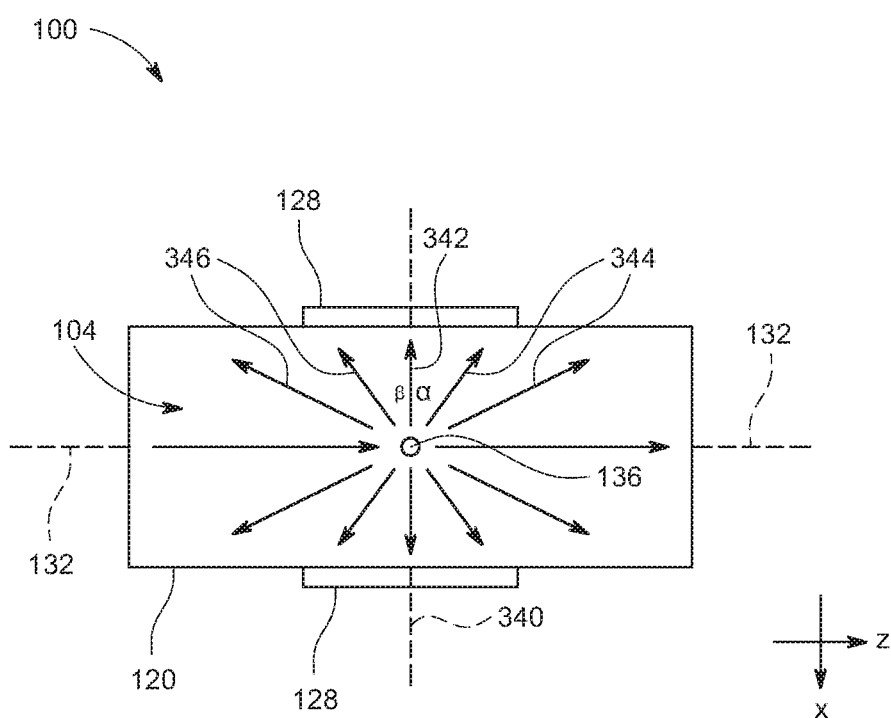
FIG. 3 is a plan view of the particle detector illustrated in FIG. 1, arbitrarily taken as the x-z plane.

FIG. 1 is a perspective view of an example of a particle detector 100 according to one embodiment of the invention. FIG. 2 is a cross-sectional view (x-y plane) of the particle detector illustrated in FIG. 1, taken at an arbitrary point along a longitudinal axis (z-axis). FIG. 3 is a plan view of the particle detector illustrated in FIG. 1, arbitrarily taken as the x-z plane.

Generally, the particle detector 100 is configured for defining (e.g., containing or enclosing) a detection cavity 104 (or sample volume) through which a particle-laden sample fluid (i.e., aerosol or liquid) may flow, producing one or more beams 108 of irradiating light (or source light) of one or more selected wavelengths, directing the beam(s) 108 into the detection cavity 104 to enable particles 112 in the detection cavity 104 to interact with the irradiating light incident on the particles 112, and collecting (receiving) measurement light (or emission light) emitted from the particles 112 in response to the irradiation. The particle detector 100 is configured for collecting measurement light over a large detection area (i.e., a large photon collection area), via a plurality of paths 116 over which the measurement light propagates, as partially depicted by rays in FIG. 1. For these purposes, the particle detector 100 may include a housing 120 or other structure for defining a flow-through detection cavity 104, one or more light (photon) sources 124 for producing one or more beams 108 of irradiating light, and one or more light detectors (or sensors) 128 for collecting measurement light over a plurality of different paths 116. The particle detector 100 may be operated to acquire particle data in real time as sample fluid flows through the particle detector 100. While not shown in FIG. 1, the present invention includes as shown in FIG. 4 an alignment rail.

Figure 4:
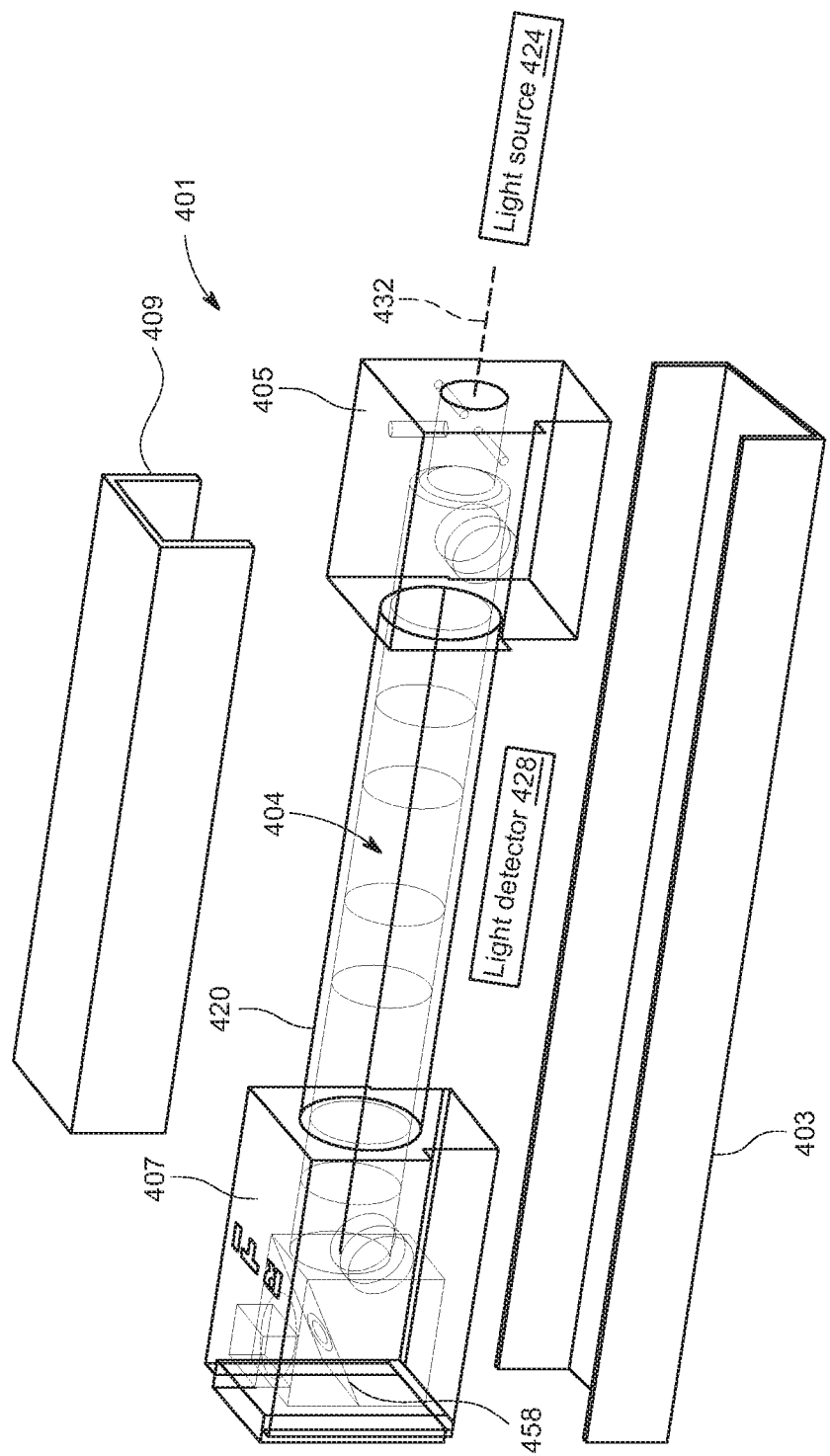
FIG. 4 is a perspective view of an example of an optical system for particle detection according to some embodiments of the present disclosure.

FIG. 4 is a perspective view of an example of an optical system for particle detection for use in the present invention. Optical system 401 may facilitate the rapid assembly of various components that may be used to measure and detect particles using a light source. The optical system 401 may include an alignment rail 403, a housing 420 having a wall defining a flow-through detection cavity 404, one or more light sources 424 (depicted here schematically), a sample inlet housing 405, a sample outlet housing 407, a light trap 458, one or more light detectors (or sensors) 428 (depicted here schematically as an element adjacent the detection cavity, but explained in more detail below), and an optional cover 409, as well as one or more other features described herein and illustrated in FIGS. 1 to 10. The housing 420 may be a clear gas flow tube that extends from the sample inlet housing 405 to the sample outlet housing 407 and may be connected by sliding the sample inlet housing 405 or the sample outlet housing 407 toward each other. In some embodiments, the housing 420 (or housing portion defining the detection cavity 404) may be generally cylindrical as illustrated in FIG. 4, while in other embodiments it may be spherical or polygonal. The light source 424 (shown schematically as an element adjacent the sample inlet housing 405) may be outside or inserted into sample inlet housing 405. The light source 424 irradiates light through the detection cavity 404 to irradiate particles of a sample fluid flowing through the detection cavity 404. For example, the light source 424 may be a laser (or other wavelength resolved light) configured to irradiate light through the detection cavity 404 to particles of a sample fluid flowing through the detection cavity 404. The light detectors 428 may be located outside the housing 420 to detect light that is scattered by particles of the sample fluid in the detection cavity 404.

Some or many of the components of the optical system 401 may be fabricated using a 3D printer to precisely align the sample inlet housing 405 and sample outlet housing 407 on the alignment rail 403. The sample inlet housing 405 and sample outlet housing 407 can be moved closer or further apart along the alignment rail 403 to allow for the use of light detectors 428 of various sizes and shapes as described herein for particle measurement and detection. The optical system 401 disclosed herein allows for the precise alignment of a laser and beam to be coaxially positioned down the length of the optical bench. Such alignment may include a laser alignment mechanism within the sample inlet housing 405 to adjust the alignment of the laser.

The alignment rail 403 provides an alignment track on which the optical system 401 components may be assembled. The alignment rail 403 in one embodiment is a rigid rail. The alignment rail 403 is not limited in size or shape and may be designed based on the light detectors 428 that are being used and the application for which they are used. The alignment rail 403 may have a base and sidewalls that form a channel in which to place and move or slide the sample inlet housing 405 and the sample outlet housing 407 along the channel. To ensure the sample inlet housing 405 and sample outlet housing 407 can easily move in the alignment rail 403, the width of sample inlet housing 405 and the sample outlet housing 407 should be less than the width of the channel formed in the alignment rail 403. The alignment rail 403 is preferably rigid to allow for the precise alignment and positioning of the optical system 401 components on the alignment rail 403 and to stabilize the optical system 401 components against misalignment. The alignment rail 403 may be composed of aluminum, but it is not limited to a particular material. Other materials such steels, plastics, and composite materials can be used for the alignment rail.

As used herein, the term "rigid" refers to a construct such as the alignment rail that has a sufficient stiffness to hold alignment of a light beam at a distance of 50 cm to within a tolerance of 1000 μm across that distance between optical components. In a preferred embodiment, the construct has a sufficient stiffness to hold alignment of a light beam at a distance of 50 cm to within a tolerance of 500 μm across that distance. In a preferred embodiment, the construct has a sufficient stiffness to hold alignment of a light beam at a distance of 50 cm to within a tolerance of 200 μm across that distance. In a preferred embodiment, the construct has a sufficient stiffness to hold alignment of a light beam at a distance of 50 cm to within a tolerance of 100 μm across that distance. In a preferred embodiment, the construct has a sufficient stiffness to hold alignment of a light beam at a distance of 50 cm to within a tolerance of 50 μm across that distance. Alternatively, since the distance is arbitrary to establishing a criterion for the stiffness of the alignment rail, the term "rigid" refers to a construct such as the alignment rail that has a sufficient stiffness to hold alignment of a light beam at a distance of 35 cm to within a tolerance of 1000 µm across that distance between optical components. In a preferred embodiment, the construct has a sufficient stiffness to hold alignment of a light beam at a distance of 35 cm to within a tolerance of 500 µm across that distance. In a preferred embodiment, the construct has a sufficient stiffness to hold alignment of a light beam at a distance of 35 cm to within a tolerance of 200 µm across that distance. In a preferred embodiment, the construct has a sufficient stiffness to hold alignment of a light beam at a distance of 35 cm to within a tolerance of 100 µm across that distance. In a preferred embodiment, the construct has a sufficient stiffness to hold alignment of a light beam at a distance of 35 cm to within a tolerance of 50 µm across that distance.

The sample inlet housing 405 and sample outlet housing 407 may be placed in the alignment rail 403 and adjusted by smoothly sliding the sample inlet housing 405 or sample outlet housing 407 along the longitudinal length of the alignment rail 403. The sample inlet housing 405 and sample outlet housing 407 may be secured to the alignment rail using fasteners to keep them from moving as would be known to persons skilled in the art. The ease of making adjustments may be enhanced by using exact dimensions and a radius or beveled edges on the bottom corners of the sample inlet housing 405 and sample outlet housing 407 to accommodate imperfections in the alignment rail 403.

The cover 409 may be used for multiple purposes. The cover 409 may extend from the sample inlet housing 405 to the sample outlet housing 407. The cover 409 may be used to block any external light from reaching the light detectors 428 that may be positioned along the housing 420 underneath the cover 409 since the light detectors may be extremely sensitive to light. The cover may also provide a grounded "shield" when connected to the alignment rail 403 to block any electronic noise that may be around the optical system 401. The cover 409 may also protect any sensitive optical materials or components that may be located inside the sensor cavity that is created with the cover 409 is placed on the alignment rail 403. The cover 409 may be composed of aluminum, but it is not limited to that material.

The optical system 401 allows for the rapid building of a precise optical bench, with laser, sensors, and light trap. The optical system 401 allows the optical bench to be built outside of a device. Laser alignment, sensor adjustment, and even performance and calibration testing may be done prior to installation into the desired sensor housing. The optical system 401 can have multiple sizes and applications as needed.

In the present context, "irradiating" light refers to the light produced by a light source and utilized to irradiate particles in a detection cavity, as distinguished from measurement light and as also distinguished from background light (i.e., non-analytical light that would only contribute to background signal noise, such as ambient light). In the present context, "measurement" light refers to the light emitted from the particles in response to the irradiation. Measurement light may be light scattered (reflected) from the particles or fluorescent light emitted from the particles. The particle detectors (discussed herein) may be configured for measuring scattered light and/or fluorescently emitted light. The particle detector (discussed herein) may be configured for measuring scattered light and fluorescently emitted light simultaneously or sequentially.

As regards scattered light, the particle detectors (discussed herein) may be configured in particular for measuring elastically scattered light. Irradiating light incident on a particle may be elastically scattered from the particle at the same wavelength as the irradiating light, in accordance with the particle's size and shape and the difference in the index of refraction of the particle and that of the sample fluid. The scattering mode may be Rayleigh scattering, Mie scattering, or geometric scattering, depending on the size of the particle relative to the wavelength of the irradiating light. As regards fluorescently emitted light, the irradiating light may be utilized as an excitation light for inducing autofluorescence in the fluorophores of a particle (particularly a bio-particle). That is, irradiating light of an appropriate wavelength or wavelength range incident on a fluorophore-containing particle may be absorbed by the particle and thereby induce the particle to fluoresce, i.e., emit light at a different (typically longer) wavelength or wavelength range.

Generally, measurement light may propagate from an irradiated particle in any of a large number of directions relative to a longitudinal axis 132, as further shown in FIGS. 2 and 3. For reference purposes, the longitudinal axis 132 may be considered as the z-axis, and the cross-sectional plane orthogonal to the longitudinal axis 132 may be considered as the x-y plane. In the illustration of FIG. 2, an irradiated particle 136 has been arbitrarily located directly on the longitudinal axis 132.

As shown in FIG. 2, most or all paths 116 along which the measurement light propagates have a radial component relative to the longitudinal axis 132. As noted above, FIG. 3 is a plan view of the particle detector 100. The plan view has been arbitrarily taken as the x-z plane, with the understanding that rotating the particle detector 100 ninety degrees about the longitudinal axis 132 to the y-z plane would yield essentially the same view. The x-y plane in which the irradiated particle lies at the instant of time at or shortly after irradiation is indicated by a vertical dashed line 340. As shown in FIG. 3, the paths or directions along which the measurement light propagates may include purely radial paths 342, forward-angle paths 344, and back-angle paths 346, relative to the x-y plane 340. In the present context, a purely radial path lies 342 substantially in the x-y plane 340, a forward-angle path 344 is oriented at some positive angle α relative to x-y plane 340 (i.e., has both a radial component and an axial component pointed in the downstream direction), and a back-angle path 346 is oriented at some negative angle β relative to x-y plane 340 (i.e., has both a radial component and an axial component pointed in the upstream direction). As described further below, the light detector 128 is capable of capturing photons propagating over a large number of purely radial paths 342, forward-angle paths 344, and back-angle paths 346 emanating from an irradiated particle 136.

Referring again to FIGS. 1 and 4, the housing 120 or 420 or other structure defining the detection cavity 104 may surround or enclose a chamber or interior about the longitudinal axis 132 such as by way of an coaxially surrounding wall as seen in the drawings such as shown in FIGS. 1 and 4. The chamber or interior may be coextensive with, or at least may include, the detection cavity 104 or 404. The housing 120 or 420 (or a portion thereof defining the detection cavity 104) may be generally symmetrical about the longitudinal axis 132 or 432 such that the longitudinal axis 132 is the central axis of the housing 120 or 420 (or housing portion defining the detection cavity 104 or 404). In some embodiments, the housing 120 or 420 (or housing portion defining the detection cavity 104 or 404) may be generally cylindrical as illustrated in FIG. 1, while in other embodiments may be spherical or polygonal. The housing 120 or 420 may be configured such that the detection cavity 104 or 404 is elongated along the longitudinal axis. As one example of an elongated geometry, the length of the detection cavity 104 or 404 along the longitudinal axis 132 or 432 may be greater than its cross-sectional dimension.

In some embodiments the housing 120 or 420, or at least the portion of the housing 120 or 420 defining the detection cavity 104 or 404, may be composed of a low reflectance material, or at least the inside surface of the housing 120 or 420 (or a coating applied thereon) may be composed of a low reflectance (or opaque, or anti-reflective) material. This may be useful in preventing stray light from reaching the light detector 128 or 428.

In the present context, the term "cross-sectional dimension" refers to the maximum dimension that characterizes the size of the detection cavity's cross-section (cross-sectional flow area) in the plane orthogonal to the longitudinal axis 132 (e.g., the diameter of a circular cross-section, the major axis of an elliptical cross-section, or the length of a side or distance between opposing corners of a polygonal cross-section). As illustrated in FIG. 1, the housing 120 includes a sample inlet 152 and a sample outlet 154 positioned such that the housing 120 defines a sample flow path from the sample inlet 152, through the detection cavity 104, and to the sample outlet 154. The sample inlet 152 and sample outlet 154 are typically open to the ambient environment outside the particle detector 100. The axial length of the detection cavity 104 may defined between a first end into which sample fluid is received and an axially opposite second end from which sample fluid is discharged. Depending on the configuration of the housing 120, the first end of the detection cavity 104 may generally correspond to (or be located proximal to) the sample inlet 152, and the second end of the detection cavity 104 may generally correspond to (or be located proximal to) the sample outlet 154.

The light source(s) 124 or 424 may be any light source suitable for producing irradiating light of a selected wavelength. Typically, the selected wavelength is a single wavelength, which may be a predominant wavelength or peak wavelength (or center wavelength) in a case where the light source 124 or 424 emits photons in a narrow wavelength band around the selected wavelength. The irradiating wavelength or wavelengths may be selected for implementing a certain type of measurement, such as scattered light or fluorescent light. Examples of light sources 124 or 424 can include, but are not limited to, light emitting diodes (LEDs), lasers, laser diodes (LDs), and lamps configured for emitting light predominantly at a peak or center wavelength. The power at which the light source 124 or 424 emits irradiating light may be on the order of watts (e.g., 0.5 to 10 W), although more generally no limitation is placed on the output power of the light source 124. The light source 124 or 424 may be configured for continuous wave (CW) and/or pulsed operation. The light source 124 or 424 may be positioned relative to the detection cavity 104 such that the beam 108 of irradiation light is coaxial or substantially coaxial with the longitudinal axis 132 or 432. The light source 124 or 424 may be mounted to the housing 120 or other structure of the particle detector 100 by any suitable means. The light source 124 or 424 may be mounted at or proximal to the first end of the detection cavity 104 or 404, such that the irradiation light propagates generally parallel with and in the same direction as the sample fluid flows through the detection cavity 104 or 404. Depending on the type of light source 124 or 424 utilized, the beam 108 may be coherent or non-coherent (diverging). The beam 108 may provide a generally cylindrical particle irradiation region within the detection cavity 104 or 404 of large cross-section and thus large volume, as opposed to a line or point generated by a conventionally focused laser beam. The cross-section of the beam 108 may be circular or elliptical. The relatively large volume of the beam 108 may result in increased sensitivity and lowered limit of detection (LOD) of the particle detector 100. In some embodiments, the beam 108 has a cross-sectional dimension (e.g., diameter or major axis) in a range from 0.4 mm to 4 cm (4000 mm). In some embodiments, the beam 108 has a cross-sectional area in a range from 1% to 80% of the cross-sectional area of the detection cavity 104 or 404.

The light source 124 or 424 may be configured for emitting the irradiating light at an irradiating wavelength selected for the type of measurement to be made. In some embodiments, the irradiating wavelength is in a range from 250 to 1500 nm. In various embodiments, the irradiating wavelength may be in the ultraviolet range, the visible range, or the infrared range. For measuring scattered light, the light source 124 or 424 may be selected based on factors such as low cost, emission at an irradiating wavelength that does not induce autofluorescence, etc. For measuring fluorescent emission, the light source 124 or 424 may be selected based on irradiating wavelength needed to excite certain bio-particles of interest. In some embodiments, longer irradiating wavelengths may be utilized for detecting scattered radiation while shorter irradiating wavelengths may be utilized for exciting fluorophores. For example, visible to long wavelengths such as violet (e.g., 405 nm) to infrared (IR, e.g., 900 nm) may be utilized for detecting scattered radiation, with red (e.g., 650 nm) to near IR wavelengths being typical in some embodiments. As another example, ultraviolet (UV) to blue wavelengths (e.g., 365 to 450 nm) may be utilized for exciting fluorophores. The TABLE below provides ground- and excited-state properties of a few biologically relevant fluorophores, nicotinamide adenine dinucleotide (NADH) and riboflavin, as well as an experimental surrogate, 2% Tinopal-on-Syloid, which is Syloid® silica powder (W.R. Grace and Company, Columbia, Md., USA) tagged with 2% Tinopal® CBS X florophore (BASF, Florham Park, N.J., USA).

TABLE

| Fluorophore | Total Fluorophores Per Particle, (#/particle) | Extinction Coefficient, ($M^{-1} cm^{-1}$) | Absorbance Onset (nm) | Emission Spectral Range | Quantum Yield for Fluorescence | Fluorescence Lifetime (ns) |
|---|---|---|---|---|---|---|
| 2% Tinopal-on-Syloid | $1.5 \times 10^7$ | 1,000 | <420 | 380-575 | 0.81 | 1.2 |

TABLE-continued

| Fluorophore | Total Fluorophores Per Particle, (#/particle) | Extinction Coefficient, (M$^{-1}$ cm$^{-1}$) | Absorbance Onset (nm) | Emission Spectral Range | Quantum Yield for Fluorescence | Fluorescence Lifetime (ns) |
|---|---|---|---|---|---|---|
| Free NADH (protein-bound NADH) | 4.8 × 10$^6$ | 6,220 | <410 | 390-510 | 0.020 (0.08) | 0.38, 0.74 (1.2) |
| Riboflavin | 2 × 10$^6$ | 15,000 | <500 | 480-610 | 0.3 | 4.1 |

In some embodiments, the particle detector 100 may include a light trap 158 or 458 (optical "beam dump") as shown for example in FIG. 1 or 4. The light trap 158 or 458 may be positioned in optical alignment with the light source, on the opposite side of the detection cavity as the light source. Generally, the light trap 158 or 458 may have any configuration suitable for effectively absorbing light and preventing light from being reflected back into the detection cavity. Various configurations for light traps are known to persons skilled in the art. As examples, the light trap 158 or 458 may include a plate or cavity that is opaque ("optically black") or anti-reflective, or at least the surface(s) of such plate or cavity facing the detection cavity (or coating on the surface) is opaque or anti-reflective. The light trap 158 or 458 may include geometries or structures configured for trapping light as appreciated by persons skilled in the art. If needed, the light trap 158 or 458 may include a heat sink or other means for removing heat from the light trap 158 or 458.

In some embodiments, if needed or desired, the particle detector 100 may include a device (one or more components) configured for preventing stray light from impinging on the light detector 128 or 428. Generally, stray light is any light having no analytical value such that measurement of the light by the light detector 128 or 428 is undesired. An example of stray light is irradiation light directly impinging on the light detector 128 or 428 without having first interacted with a particle to produce scattered or fluorescent light. Stray light elevates the detector output signal produced by the light detector 128 or 428 even in the absence of particles in the detection cavity, and thus may contribute to a large background (or baseline) signal that lowers the signal-to-noise (S/N) ratio of the particle detector 100, and may also convolute the measurement data. It is desirable to minimize the background signal to stay within the sensitive part of the response curve of the light detector 128 or 428. Testing has demonstrated that reducing the baseline voltage response of the light detector 128 from 1 volt (V) to a few millivolts (mV) dramatically lowered the LOD for aerosol from 1,000 s #/cm$^3$ to less than 100#/cm$^3$.

Figure 5:
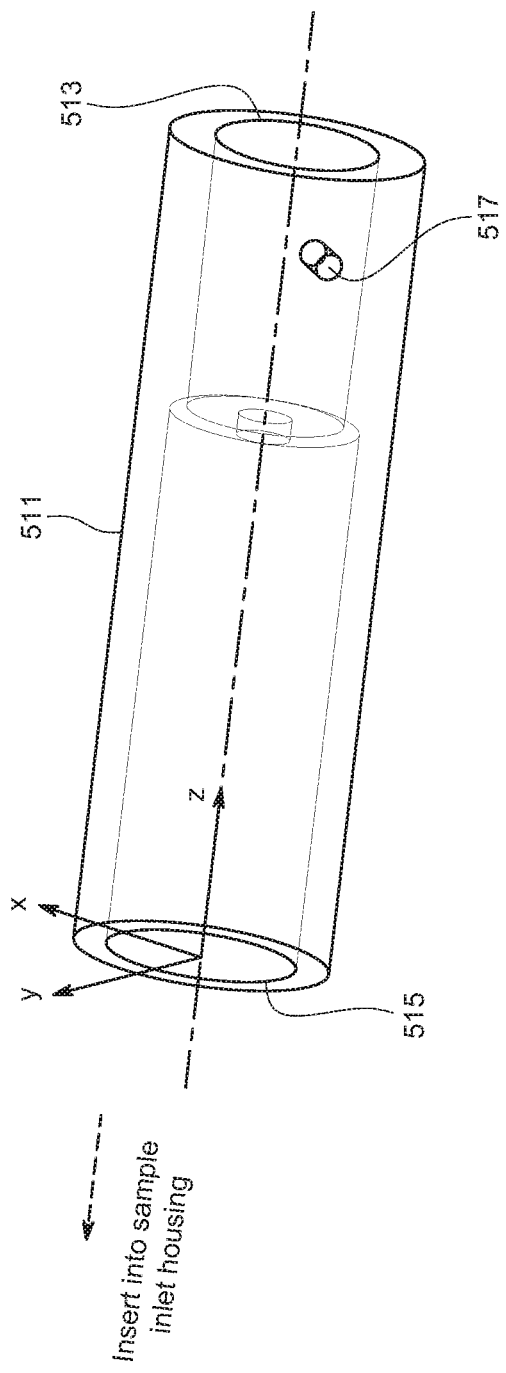
FIG. 5 is a perspective view of an example of a heat sink that may be utilized in the optical system for particle detection as disclosed herein.

FIG. 5 is a perspective view of an example of a heat sink that may be utilized in the optical system for particle detection. A heat sink 511 provides for the thermal dissipation of heat from a laser during operation of the optical system 401. The heat sink 511 may be composed of aluminum or other conductive material. The heat sink 511 may have a laser housing end 513 and a sample inlet housing end 515. The heat sink 511 may be sized according to its application requirements and is not limited to the dimensions shown in FIG. 5. The heat sink 511 is designed to allow a laser housing (not shown) to be inserted into the laser housing end (opening) 513 of the heat sink 511. The laser housing is held in place in the heat sink 511 by at least one laser housing set screw 517. The heat sink 511 may have two apertures incorporated along its length. The first aperture on the laser housing end 513 is the one closest to the laser, and it removes a portion of the unwanted extra laser light known as the "halo". A second aperture may be positioned at the inlet housing end 515 of the heat sink 511. The second aperture may be the same inner aperture dimensions as the first aperture, but it is not limited to this dimension. The correct aperture dimensions may be determined by a beam analysis.

Figure 6:
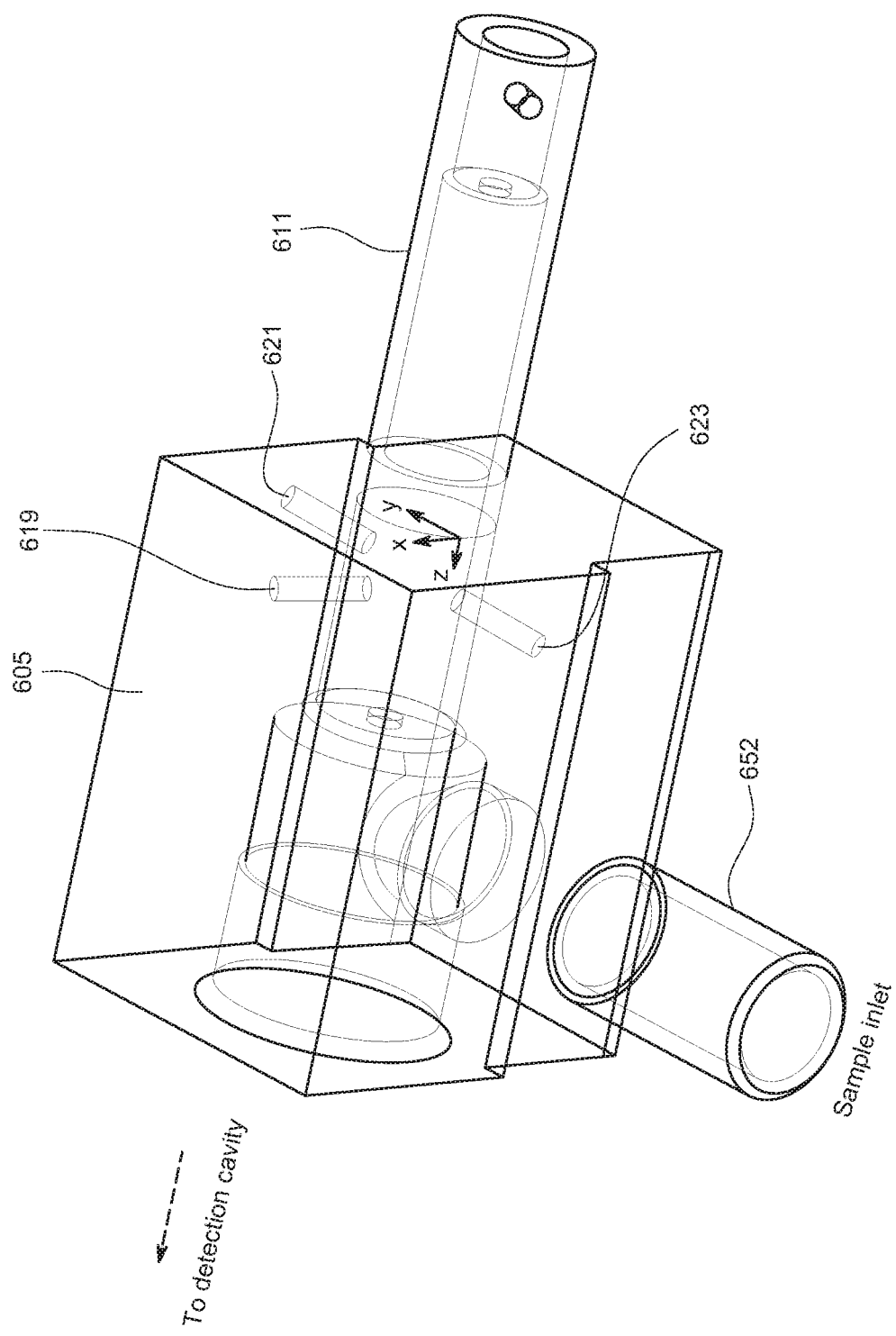
FIG. 6 is a perspective view of an example of a sample inlet housing that may be utilized in the optical system for particle detection as disclosed herein.

FIG. 6 is a perspective view of an example of a sample inlet housing that may be utilized in the optical system for particle detection. A heat sink 611 or laser housing (not shown) may be slid into the front of a sample inlet housing 605 and then adjusted as needed and held in place by at least one or more alignment screws 619, 621, and 623. The at least one alignment screws 619, 621, and 623 may be used to adjust the alignment of the laser. The present invention may include more alignment screws as needed, including the use of four, five, six, or more alignment screws. A sample inlet 652 may be slid into place and glued into the side of the sample inlet housing 605 as shown. Other embodiments are possible; integrated fabrication via 3D printing; affixed by other methods including plastic welding, taped, or a friction fit. The sample inlet housing 605 has its base configured to fit into alignment rail 403 (FIG. 4). The length, angle, and inside diameter of the sample inlet 652 may be adjusted as necessary depending on the particular application requirements.

Figure 7:
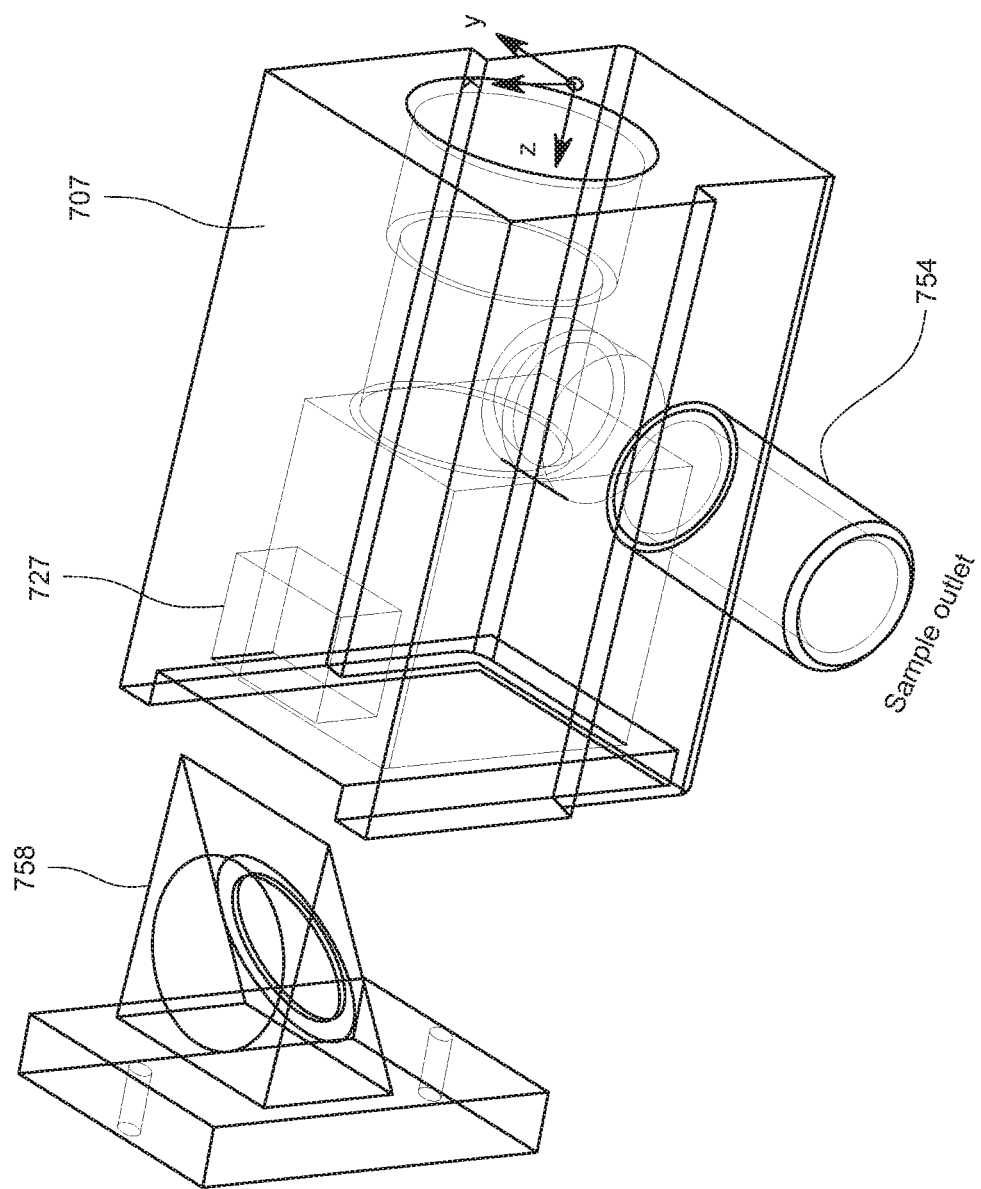
FIG. 7 is a perspective view of an example of a sample outlet housing and light trap that may be utilized in the optical system for particle detection as disclosed herein.

FIG. 7 is a perspective view of an example of a sample outlet housing and light trap that may be utilized in the optical system for particle detection. In this embodiment, a sample outlet housing 707 may include a sample outlet 754 to provide an outlet for a sample fluid as it exits the sensor section of the optical system 401 (FIG. 4). The sample outlet housing 707 may restrict the flow of the sample fluid through the sample outlet 754. The sample outlet housing 707 may include a light trap 758 to extinguish or absorb a laser beam after it passes through the detection cavity 404 of the optical system 401. The light trap 758 may be efficient, yet easy to use and maintain. The light trap 758 may be located on an end of the sample outlet housing 707 and slid into place. The light trap 758 may include for example a one-inch diameter optically colored glass. The optically colored glass would fit into a holder in the light trap 758. The optically colored glass may preferably be positioned at a 30-degree angle to allow any laser beam wavelength that is not absorbed by the glass to be aimed into a specifically designed laser window 727 or "chamber" that is coated with an opaque, light-absorbing material. The laser window 727 may be on top of the sample outlet housing 707 to allow for laser alignment on the optically colored glass and is covered during normal use. The sample outlet housing 707 has its base configured to fit into alignment rail 403.

As illustrated in FIGS. 4 to 7 the optical system 401 may include the housing 420, the sample inlet housing 405, the sample outlet housing 407, the sample inlet 652, and sample outlet 754 positioned such that the housing 420 defines a sample flow path from the sample inlet 652, through the sample inlet housing 405, the detection cavity 404, the sample outlet housing 407, and to the sample outlet 754. The light source 424, sample inlet housing 405, sample outlet housing 407, and light trap 458 may be positioned via alignment rail 403 such that an irradiating light propagates and sample fluid flows generally collinearly along a longitudinal axis 432. The particles thereby emit light in response to the irradiation that may be used to measure and detect the particles as discussed herein.

Figure 8:
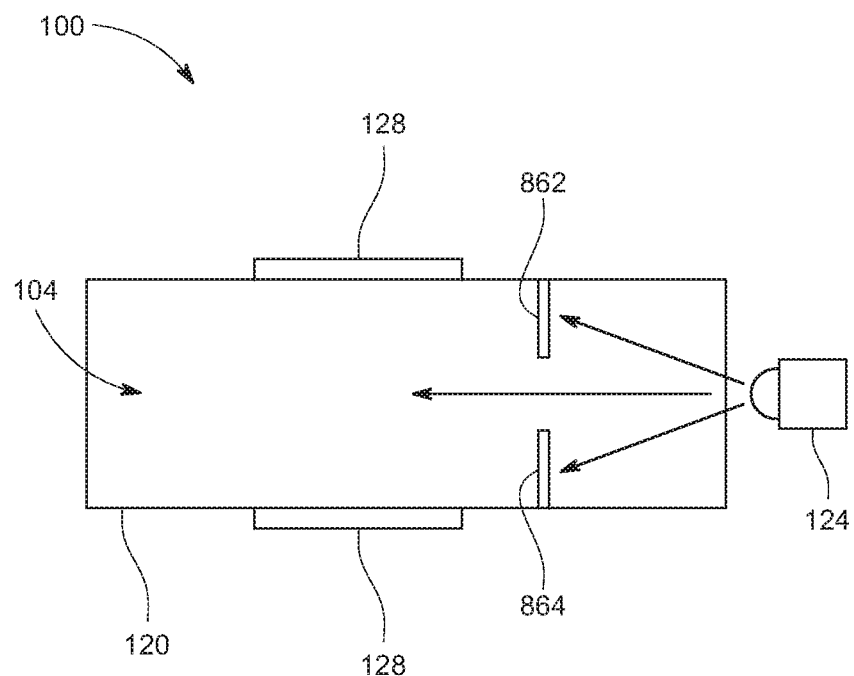
FIG. 8 is a plan view of the particle detector illustrated in FIG. 1, illustrating an example of a stray light blocking device that may be utilized in the particle detector.

FIG. 8 illustrates an example of a device in the form of a plate 862 (or wall, baffle, etc.) having an aperture 864. Generally, the plate 862 may be located optically "downstream" of the light source 124, i.e., optically between the light source 124 and the light detector 128. The plate 862, or at least the surface of the plate 862 (or a coating on the surface) facing the light detector 128, may be opaque or anti-reflective to absorb irradiation light and any other stray light. Thus, the plate 862 serves as a photon loss surface, blocking stray light that might otherwise reach the light detector 128. Meanwhile, the aperture 864 allows light (and sample fluid) to pass through the plate 862 along paths in the vicinity of the longitudinal axis 132, thereby ensuring that such light interacts with particles and is likely to be irradiation light of the intended wavelength. The axial position of the plate 862 relative to the light source 124 and the light detector 128, and the size of the aperture 864, may be selected as needed to optimize the photon-blocking function of the plate 862. The aperture 864 may be generally centered on the longitudinal axis 132. In some embodiments, the aperture 864 should be large enough that it does not act as a gas conductance barrier, cause localized turbulence, or otherwise appreciably modify the dynamics of the sample fluid flow through the detection cavity 104. More than one plate 862 may be provided if desired. Moreover, the plate 862 may include more than one aperture 864. In other embodiments, the beam 108 of irradiation light is sufficiently coherent and/or collimated that the plate 862 or similar device is not needed.

In some embodiments, if needed or desired, the particle detector 100 may include beam shaping optics. The beam shaping optics may include one or more optics components (e.g., lenses). In the present context, the term "beam shaping optics" refers to an optical component that modifies a light beam or beam path without filtering out wavelengths.

Figure 9:
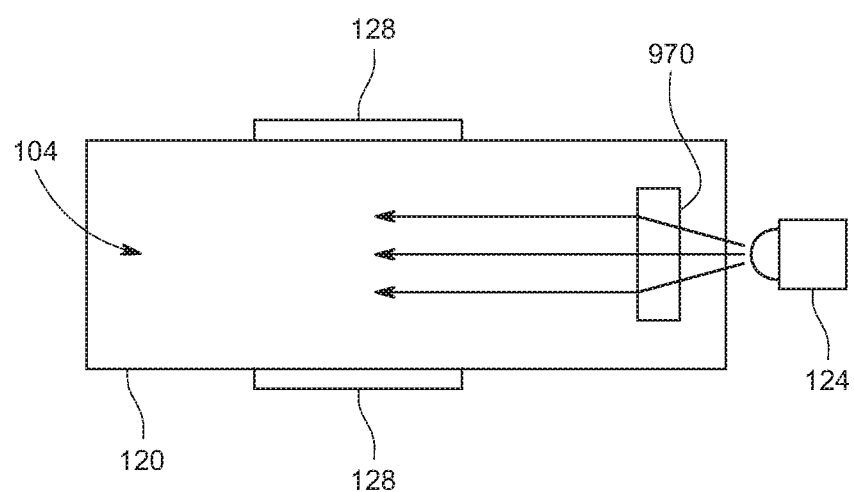
FIG. 9 is a plan view of the particle detector illustrated in FIG. 1, illustrating an example of beam shaping optics that may be utilized in the particle detector.

FIG. 9 illustrates an example of beam shaping optics 970 that can be used in the present invention. As one example, the beam shaping optics 970 may be or include a collimator (collimating lens) for collimating the beam of irradiation light. Such beam shaping optics 970 may be provided alternatively or in addition to the plate 862 or other stray light blocking device described above and illustrated in FIG. 8. The axial position of the beam shaping optics 970 relative to the light source 124 may be selected as needed to optimize its beam shaping function. In other embodiments, the beam shaping optics 970 may be integrated into the package or assembly of the light source 124. In other embodiments, the beam 108 of irradiation light generated by the light source 124 is sufficiently coherent and/or collimated that a collimator separate and distinct from the light source 124 is not needed. As another example, in addition or as an alternative to a collimator, the beam shaping optics 970 may be or include a beam expander configured for increasing the diameter of the beam 108 emitted from the light source 124.

Referring back to FIGS. 1 and 4, the light detector 128 or 428 is configured for collecting measurement light over a large detection area (i.e., a large photon collection area) via a plurality of paths 116 over which the measurement light propagates, including measurement light paths angled relative to the longitudinal axis 132 as described above. To this end, the light detector 128 or 428 may include a large-area active photo-responsive or photo-sensitive material (e.g., a photovoltaic material, photoelectric material, photoconductive material, photoresistive material, etc.). The light detector 128 or 428 also includes one or more anodes and cathodes communicating with the active material as appreciated by persons skilled in the art. The light detector 128 or 428, or at least the photo-responsive material, surrounds the detection cavity along at least a portion of the cavity length. In the illustrated embodiment, the light detector 128 or 428 or at least the photo-responsive material is constructed from a flexible material (one or more layers of flexible material(s)), enabling it either to be conformally wrapped around an outside surface of the housing 120 or 420 (or a portion of the housing defining the detection cavity) or to conformally line an inside surface of the housing 120 or 420. In a typical embodiment, the photo-responsive material is relatively thin so as to render it flexible (e.g., on the order of millimeters or smaller). The photo-responsive material may be composed of any material (or composite of two or more materials) exhibiting efficient photo-responsive (e.g., photovoltaic activity, photoelectric activity, etc.) and sufficiently sensitive over the range of wavelengths of measurement light contemplated for the particle detector 100. For example, the photo-responsive material may be a thin-film inorganic, organic, or hybrid organic/inorganic semiconductor, one non-limiting example being amorphous silicon. The photo-responsive material may generally be a material having at least one electrical characteristic (current, voltage, or resistance) that varies in proportion to light incident thereon.

In some embodiments, the photo-responsive material is a photovoltaic (PV) material that produces both a current response and a voltage response to photons incident on its surface. For low light conditions, both a current response and voltage response are observed and are proportional to the amount of photons striking the PV material. The open-circuit voltage (OCV) of a PV material may show a measurable response to low-level particulate concentration changes (e.g., less than $100\#/cm^3$), due to the logarithmic response relationship between increases in low-level incident light (<<0.1 Suns; or the amount of incident photons corresponding to elastic scattering from particles or fluorescence emissions) and the resulting increase in OCV. In other cases, such as high particle concentrations, measurement of the current response of the PV material may be more useful. In some embodiments, the PV material may a solar cell, which may be a commercially available solar cell.

In a typical embodiment, at least one side of the photo-responsive material is supported by a flexible substrate (e.g., a polymer layer or film such as polyimide). In some embodiments the photo-responsive material may be completely encapsulated by (or embedded in) the substrate, or sandwiched between the substrate and an additional encapsulating layer or film, to protect the photo-responsive material from the operating environment. Any layer or film covering the photon collecting side of the photo-responsive material should be optically transparent. In some embodiments, the photon collecting side may be covered by a transparent electrode. In some embodiments, the photon collecting side may be covered by a layer or film of an optical filter material, examples of which are described below.

The photo-responsive material may completely or substantially completely surround the detection cavity to provide a detection area spanning 360° or nearly 360° around the longitudinal axis. The photo-responsive material may contiguously surround the detection cavity. Alternatively, the photo-responsive material may include a plurality of discrete units or cells of photo-responsive material spaced apart from each other and collectively surrounding the detection cavity.

Figure 10:
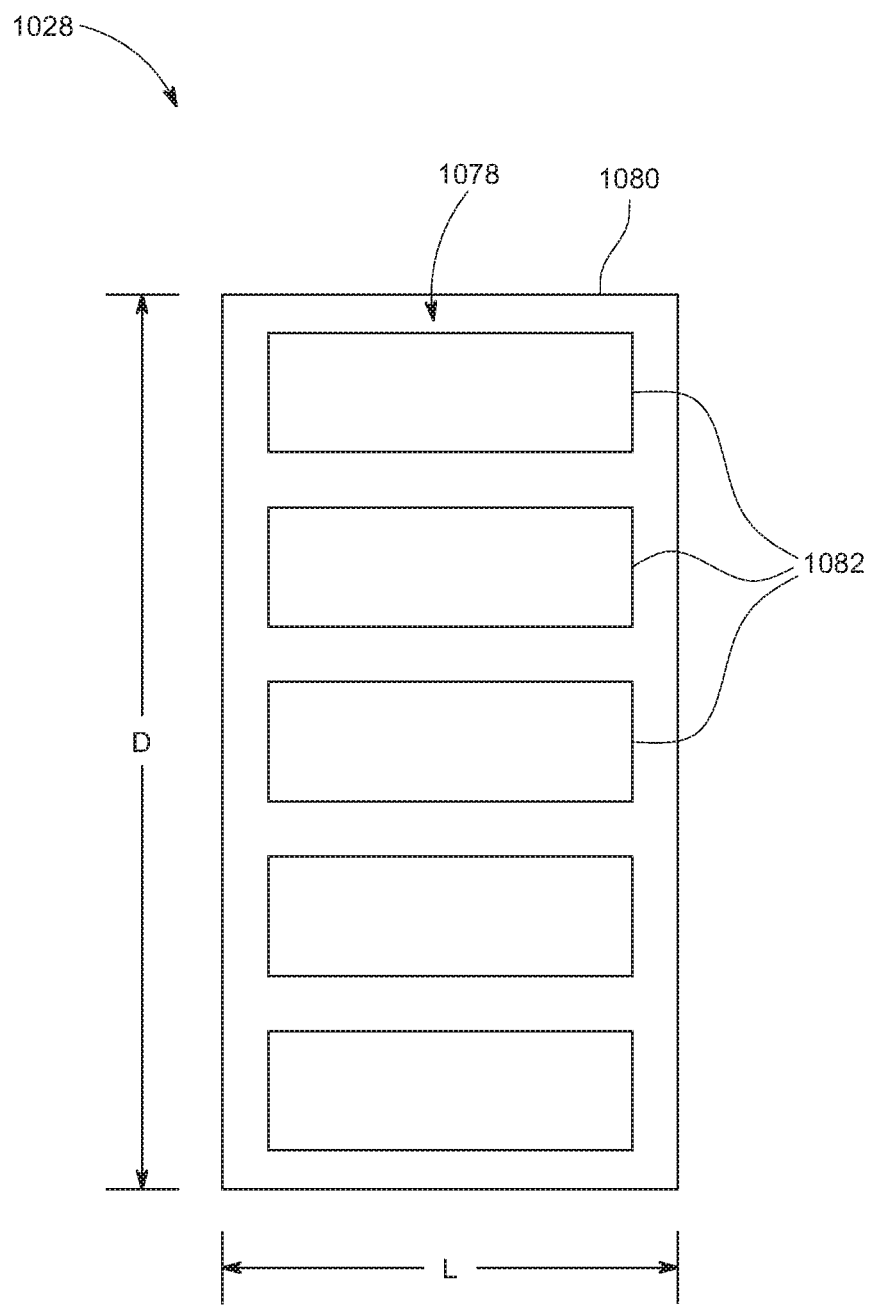
FIG. 10 is a plan view of an example of a flexible light detector that may be utilized in particle detectors disclosed herein.

FIG. 10 is a plan view of an example of a flexible light detector 1028 that may be utilized in the particle detector. The light detector 1028 may generally include a flexible photo-responsive material 1078 disposed on a flexible substrate 1080. In this example, the photo-responsive material 1078 includes a plurality of photo-responsive materials, or photo-responsive units or cells 1082 (which may also be referred to light detector units or cells, and which in some embodiments may be photovoltaic (PV) units or cells such as solar cells). The photo-responsive units 1082 are spaced apart from each other, but may be closely grouped so as to maximize the size of the active detection area. While in the illustrated example the photo-responsive units 1082 are arranged in a one-dimensional array, in other embodiments they may be arranged in a two-dimensional array. The light detector 1028 may initially be provided as a planar strip, and thereafter manipulated so as to surround the detection cavity 104 or 404. For example, the light detector 1028 may be conformally mounted to the housing 120 or 420 as noted above. Thus, in the case of a cylindrical or spherical housing, the light detector 1028 may surround the detection cavity 104 or 404 as a cylinder, band, or ring. The light detector 1028 may present a significant surface area (L×D) largely occupied by the active material of the photo-responsive units 1082. As one non-limiting example, the dimension L may be on the order of one or more tens of millimeters, and the dimension D may be on the order of tens to hundreds of millimeters. When applied to a cylindrical or spherical housing, the dimensions L and D respectively correspond to a cylinder length and diameter of the light detector 1028. The light detector 1028 may include various current-carrying components (interconnects, wires, contacts, and the like, not shown) as appreciated by persons skilled in the art. In one non-limiting example, the light detector 1028 may be based on a PV module commercially available from PowerFilm, Inc., Ames, Iowa, USA (e.g., model MP3-37).

In all such embodiments, the photo-responsive material 1078 provides a very large number of detection points surrounding the detection cavity 104 on which photons of the measurement light may be incident and thereby detected and measured. These detection points may be located at different angular positions relative to the central axis (over dimension D in FIG. 10) and/or different axial positions relative to the longitudinal axis (over dimension L in FIG. 10). As evident from FIGS. 2 and 3, the photo-responsive material 1078 provides a target for measurement light propagating over many different paths from an irradiated particle. By this configuration, the light detector 1028 is able to output an electrical detector signal of relatively high intensity measurement even though individual optical measurement signals emanating from the particles may be relatively weak.

Referring back to FIG. 1, in some embodiments the particle detector 100 further includes one or more optical filters 186 positioned optically between the photon collecting side of the photo-responsive material of the light detector 128 and the longitudinal axis 132. That is, the optical filter 186 is positioned such that any measurement light directed toward the photo-responsive material must first pass through the optical filter 186. In some embodiments, the optical filter 186 is disposed on the photo-responsive material, i.e., directly on the photo-responsive material or on a layer or film covering or encapsulating the photo-responsive material. The optical filter 186 generally may be configured to block one or more ranges of wavelengths, and thus may be a low-pass, high-pass, or band-pass filter. The optical filter 186 may be a composite of two or more optical filters to obtain the desired pass/block characteristics. The optical filter 186 may be a solid (e.g. glass or polymer) or gel (e.g. polymer) material, and may be thin and/or pliable enough to be flexible so as to conformally cover the photo-responsive material. In one non-limiting example, a gel filter may be one commercially available from Rosco Laboratories, Inc., Stamford, Conn., USA. Such optical filters are applicable to FIG. 4.

The cross-sectional view of FIG. 2 illustrates some examples of possible arrangements of the photo-responsive material and optical filter relative to the housing. At the region of the detection cavity 104 where the photo-responsive material and optical filter are located, the particle detector 100 may be considered as including at least three layers surrounding the detection cavity: a first (inner) layer 202, a second (intermediate) layer 206 surrounding the first layer 202, and a third (outer) layer 210 surrounding the second layer 206. In one embodiment, the first layer 202 is the optical filter, the second layer 206 is the housing (i.e., a wall of the housing), and the third layer 210 is the photo-responsive material. Thus in this embodiment, the optical filter is conformally disposed on the inside surface of the housing, and the photo-responsive material is conformally disposed on the outside surface of the housing. In another embodiment, the first layer 202 is the optical filter, the second layer 206 is the photo-responsive material, and the third layer 210 is the housing. Thus in this embodiment, the photo-responsive material is conformally disposed on the inside surface of the housing, and the optical filter is conformally disposed on the photo-responsive material, such that the photo-responsive material is sandwiched between the housing and the optical filter. In yet another embodiment, the first layer 202 is the housing, the second layer 206 is the optical filter, and the third layer 210 is the photo-responsive material. Thus in this embodiment, the optical filter is conformally disposed on the outside surface of the housing, and the photo-responsive material is conformally disposed on the optical filter, such that the optical filter is sandwiched between the photo-responsive material and the housing. In cases where the photo-responsive material is outside the housing, the housing (or at least the portion coextensive with the photo-responsive material) is optically transparent. If needed, the layers 202, 206, and 210 may be secured to each other by any suitable means such as adhesives, mechanical fasteners, etc. In embodiments without the optical filter, the photo-responsive material may be conformally disposed directly on the inside surface or outside surface of the housing.

The optical filter may generally be configured for blocking any selected wavelength or range(s) of wavelengths (undesired photons), depending on the application. For example, when measuring autofluorescence, the optical filter may be configured for passing the wavelengths of the fluorescent measurement light while blocking the wavelength of the irradiating light utilized to excite the fluorophores. As another example, when measuring scattering, the optical filter may be configured for passing the wavelength of the irradiating light (and thus the wavelength of the scattered measurement light) while blocking other wavelengths such as, for example, stray ambient light.

Referring again to FIG. 1, in some embodiments the particle detector 100 may further include a data acquisition device 190 that may be placed in signal communication with the light detector 128. The data acquisition device 190 may be configured for measuring a response of the photo-responsive material (e.g., a voltage response, a current response, and/or resistance response), as embodied in an electrical detector signal outputted by the photo-responsive material. The data acquisition device 190 may be configured for converting the analog detector signal to a digital detector signal, and recording or storing the detector signal. The data acquisition device 190 may be configured for correlating the measurement of the response with one or more properties of the particles interrogated by the irradiation light in the detection cavity 104, such as particle size, concentration, identification (e.g., a certain type of bio-particle), etc. The data acquisition device 190 may be configured for performing any post-acquisition signal conditioning or processing required or desired, such as amplification, calibration, deconvolution, formatting for transmission to another device, etc. The data acquisition device 190 may be configured for generating data relating to one or more properties of the interrogated particles, and transmitting the data to another device (e.g., a computing device) via a wired or wireless communication link, or to one or more devices via a suitable communication network. The data acquisition device 190 may be removably coupled to the light detector 128 or 428 such as by removable connections made with electrical leads from the photo-responsive material. The data acquisition device 190 may thereafter be coupled to another device to download data to that other device for analysis. As appreciated by persons skilled in the art, various functions of the data acquisition device 190 may be implemented by hardware (or firmware), software, or both. The data acquisition device 190 may include one or more processors, memories, and other hardware. In one non-limiting example, the data acquisition device 190 may be a 16-bit data logging device commercially available from Measurement Computing Corp., Norton, Mass., USA (e.g., model USB-1698FS-Plus).

In general, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

The invention claimed is:

1. An optical system for particle detection, comprising:
a sample inlet housing;
a sample outlet housing;
a detection cavity having a coaxially surrounding wall and disposed between the sample inlet housing and the sample outlet housing;
a light source configured to irradiate light through the detection cavity to particles of a sample fluid flowing inside the wall of the detection cavity;
a light detector for detecting the light that is scattered by particles of the sample fluid in the detection cavity;
an alignment rail having a base and sidewalls which a) extend from the sample inlet housing to the sample outlet housing and b) connect the sample inlet housing to the sample outlet housing; and
the alignment rail comprising a channel formed by the base and the sidewalls, the channel having a channel lateral width fitting to a housing width of at least one of the sample inlet housing and the sample outlet housing, whereby the sample inlet housing, the detection cavity, and the sample outlet housing are held in alignment together.

2. The optical system of claim 1, further comprising a light trap inserted into the sample outlet housing on a side of the sample outlet housing opposite from the detection cavity, the light trap configured to absorb the light that passes through the detection cavity into the sample outlet housing.

3. The optical system of claim 1, wherein the light source comprises a laser configured to irradiate light through the detection cavity.

4. The optical system of claim 1, wherein each of the sample inlet housing and the sample outlet housing has two beveled edges on a bottom thereof which accommodate imperfections in the channel when the sample inlet housing and the sample outlet housing are inserted into the channel of the alignment rail.

5. The optical system of claim 1, wherein the channel lateral width fits to the housing width of the sample inlet housing such that the sample inlet housing is slideable along a longitudinal length of the alignment rail before being secured.

6. The optical system of claim 1, wherein the channel lateral width fits to the housing width of the sample outlet housing such that the sample outlet housing is slideable along a longitudinal length of the alignment rail before being secured.

7. The optical system of claim 5 or claim 6, wherein, during assembly of the optical system, the sample inlet housing and the sample outlet housing are disposed in the channel, and at least one of the sample inlet housing and the sample outlet housing is slideable toward each other.

8. The optical system of claim 7, further comprising fasteners which secure the sample inlet housing and the sample outlet housing to the alignment rail.

9. The optical system of claim 8, wherein the sample inlet housing comprises an alignment mechanism which is configured to adjust alignment of the light source.

10. The optical system of claim 9, wherein, during the assembly and after the detection cavity including the coaxially surrounding wall is connected in between the sample inlet housing and the sample outlet housing, the fasteners secure the sample inlet housing and the sample outlet housing to the alignment rail, and thereafter the alignment mechanism adjusts the alignment of the light source.

11. The optical system of claim 1, wherein the sample inlet housing comprises three or more alignment screws for adjusting the alignment of the light source.

12. The optical system of claim 1, wherein the sample inlet housing comprises therein a first aperture and a second aperture farther removed from the laser than the first aperture.

13. The optical system of claim 1, further comprising a cover extending from the sample inlet housing to the sample outlet housing, wherein the cover blocks outside light from entering the detection cavity and electrically shields the light detector from outside electrical noise.

14. The optical system of claim 1, wherein the light trap comprises an optically colored glass for absorbing the light from the light source, the glass disposed relative to the laser beam at an angle to direct any of the laser beam not absorbed in the glass to an opaque, light-absorbing material inside the sample outlet housing.

15. The optical system of claim 14, wherein the light trap further comprises an interior chamber which absorbs the light from the light source not absorbed in the glass.

16. The optical system of claim 14, wherein the light trap further comprises an alignment mechanism for positioning the light trap.

17. The optical system of claim 1, wherein the alignment rail comprises a rigid rail.

18. The optical system of claim 17, wherein the rigid rail allows for the precise alignment and positioning of the sample inlet housing, the detection cavity, the sample outlet housing, the light source, and the light detector on the rigid rail.

19. The optical system of claim 17, wherein the rigid rail stabilizes the sample inlet housing, the housing, the sample outlet housing, the light source, and the light detector against misalignment.

20. A method for measuring particles in a sample fluid, comprising:
flowing the sample fluid through the optical system of claim 1 and thereby into a detection cavity;
directing an irradiating light through the detection cavity along a longitudinal axis to irradiate particles in the sample fluid, wherein the particles emit measurement light in response to the irradiation; and
receiving at a photo-responsive material measurement light propagating from the particles.

* * * * *